United States Patent
Harrelson, II

(10) Patent No.: US 10,300,995 B1
(45) Date of Patent: May 28, 2019

(54) MARINE BYPASS SYSTEM AND METHOD

(71) Applicant: Clyde Willis Harrelson, II, Burgaw, NC (US)

(72) Inventor: Clyde Willis Harrelson, II, Burgaw, NC (US)

( * ) Notice: Subject to any disclaimer, the term of this patent is extended or adjusted under 35 U.S.C. 154(b) by 0 days.

(21) Appl. No.: 15/883,269

(22) Filed: Jan. 30, 2018

(51) Int. Cl.
*B63J 4/00* (2006.01)
*B63B 59/04* (2006.01)
*B01D 35/28* (2006.01)
*G05D 7/06* (2006.01)

(52) U.S. Cl.
CPC .............. *B63B 59/04* (2013.01); *B01D 35/28* (2013.01); *B63J 4/00* (2013.01); *G05D 7/0652* (2013.01)

(58) Field of Classification Search
CPC ....... B63H 20/30; B63B 59/04; B63B 59/045; B63J 4/00; B63J 4/002; F01P 3/20; F01P 3/202; F01P 3/205
USPC ................. 440/88 N; 137/334–341
See application file for complete search history.

(56) References Cited

U.S. PATENT DOCUMENTS

| | | | | |
|---|---|---|---|---|
| 4,619,618 A * | 10/1986 | Patti | ........................ | B63H 20/36 137/240 |
| 5,183,029 A * | 2/1993 | Ranger | .................... | F24D 17/00 122/13.3 |
| 5,393,252 A * | 2/1995 | Brogdon | ................. | B63H 21/10 440/88 N |
| 5,618,214 A * | 4/1997 | Wyss | ....................... | B63B 59/04 134/169 C |
| 5,830,023 A * | 11/1998 | Brogdon | ................... | B63J 99/00 440/88 R |
| 5,918,625 A * | 7/1999 | Ziehm | .................. | F24D 17/0078 122/13.3 |
| 6,579,136 B1 * | 6/2003 | Hahn | ...................... | B63H 21/10 440/88 C |
| 7,025,643 B1 * | 4/2006 | Csitari | .................... | B63H 21/14 114/183 R |
| 9,010,354 B2 | 4/2015 | Achez | ........................... | 137/238 |
| 2006/0065319 A1 | 3/2006 | Csitari | .......................... | 137/887 |
| 2007/0105464 A1 | 5/2007 | Vasilaros | ......................... | 440/88 |
| 2009/0029609 A1 | 1/2009 | Breece et al. | .................. | 440/88 |
| 2012/0009831 A1 | 1/2012 | Howard | .......................... | 440/88 |
| 2015/0191236 A1 * | 7/2015 | Maxwell | ................ | B63H 21/38 137/563 |
| 2018/0086427 A1 * | 3/2018 | Stimmel | .............. | B63H 21/383 |

* cited by examiner

*Primary Examiner* — Ajay Vasudeva
(74) *Attorney, Agent, or Firm* — MacCord Mason PLLC

(57) ABSTRACT

Marine bypass systems and assemblies. In one embodiment, a bypass system includes a non-marine water supply injection assembly, a bypass solenoid valve, and a non-marine injector. In particular examples, the assembly comprises a heated non-marine water supply injection assembly and a non-heated, non-marine water supply injection assembly. The result is an improved device and method for enhancing the removal, and elimination, of marine growth from a marine vessel.

1 Claim, 2 Drawing Sheets

MARINE BYPASS SYSTEM AND METHOD

BACKGROUND

Field

The present disclosure relates generally to marine vessels and, more particularly, to a marine bypass system for enhancing the reduction, or elimination, of marine growth about a water inlet.

Related Art

Marine vessels incorporate water inlets for a variety of onboard applications and processes. These marine inlet devices are often fully adaptable to any type of marine situation, for instance during transit and during stationary operation.

One common problem associated with these assemblies is marine growth, fowling, clogage, and the like. For instance, marine vessels with cooling equipment often experience closing from marine growth, for instance in the tur-hull fittings, filters, piping, and appendages. Typically, the higher the water temperature and the faster the flow of water oxygenizes, thus creating increased marine growth. This restriction slows the transfer of on-board water and affects downstream release points at engines, generators, air conditioners, sanitation systems, and the like. Traditionally strainers and other types of mechanical and/or chemical applications are used to provide consistent access to marine flow through the inlets to access downstream release points.

However, conventional systems fail to efficiently and consistently provide such operation. Therefore, Applicant desires a marine bypass system, assembly, and method of operation without the drawbacks presented by the traditional systems and methods.

SUMMARY

In accordance with the present inventions, marine flush systems for reducing, or eliminating, marine growth, when present, is provided herein. These inventions provide an improved marine flush system, assembly, and methods that are convenient, efficient and safe for the user, particularly when used in marine environments.

In one embodiment, a marine bypass system in a marine vessel having at least one marine water intake located on an exterior surface of a hull of said marine vessel, said bypass system having a non-marine water supply injection assembly, a bypass solenoid valve, and a non-marine injector. The non-marine water supply injection assembly introduces non-marine water and includes a heating source, a plurality of non-marine delivery conduits, a non-marine water manifold, and at least one non-marine water solenoid. The bypass solenoid valve is typically in fluid communication with a downstream portion of said marine water intake and said non-marine supply injection assembly. The non-marine injector is typically in fluid communication with said non-marine supply injection assembly and discharges about said marine water intake to remove, when present, marine growth.

In some examples, the intake includes a marine water strainer. The heating source may be a heating tank, and in particular examples may deliver about one hundred and forty degree to about one hundred and sixty degree non-marine water supply.

In particular examples, the system may include a non-marine water temperature sender. In particular examples, the system may include a marine water valve. The system may include an injector temperature sender. The system may include a flow meter sensor. The system may include a marine water pump. The system may include a transducer antifouling assembly. The system may include a non-heated, non-marine water bypass injection assembly. In addition, in these particular examples, the system may include a non-marine, non-heated water solenoid. Further, the system may include at least one manual shut-off valve. Additionally, the system may include a non-marine water temperature sensor.

In yet another embodiment, a marine bypass system in a marine vessel having at least one marine water intake located on an exterior surface of a hull of said marine vessel includes a heated non-marine water supply injection assembly adapted for introducing heated non-marine water, said heated non-marine water supply injection assembly comprising: a hot water tank, a plurality of non-marine delivery conduits, a non-marine water manifold, and at least one non-marine water solenoid; a non-heated, non-marine water supply injection assembly adapted for introducing non-heated, non-marine water, said non-heated, non-marine water supply injection assembly comprising: a non-marine, non-heated water by-pass, and a non-marine, non-heated water solenoid; a bypass solenoid in fluid communication with a downstream portion of said marine water intake and at least one of said non-marine water supply injection assemblies, and a non-marine injector in fluid communication with at least one of said non-marine water supply injection assemblies and adapted to discharge about said marine water intake to remove, when present, marine growth.

In a further embodiment, a marine bypass assembly comprising: a plurality of primary marine flow channels comprising a plurality of inlets and corresponding releases; a non-marine water supply having downstream discharge conduits; and a plurality of secondary bypass channels in fluid communication said downstream discharge conduits, wherein said secondary bypass channels inject a path of said non-marine water about said inlets thereby removing, when present, marine growth.

In particular examples, the marine bypass assembly includes a hot water tank delivering about one hundred and forty degree to about one hundred and sixty degree non-marine water supply. The assembly may include a plurality of hot water by-pass solenoids. The assembly may include a cold-water by-pass, and in particular examples, a cold-water by-pass solenoid. The assembly may include a graphical user interface adapted to bypass said primary marine flow channels to said secondary bypass channels under preselected conditions.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
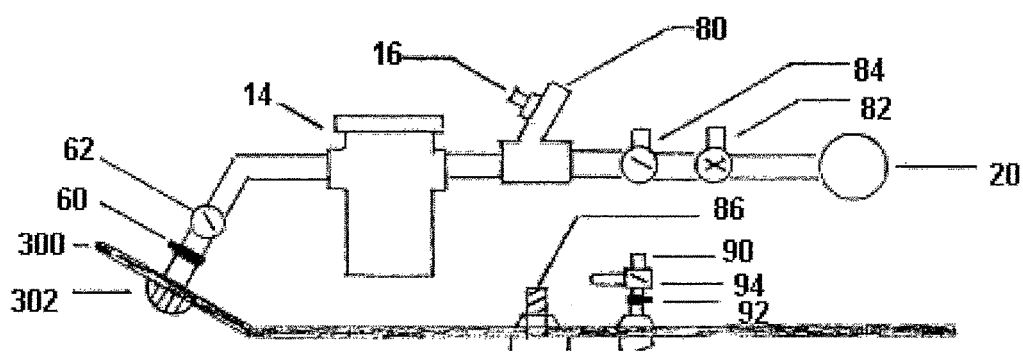
FIG. 1 is a side perspective view of a bypass assembly according to one embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
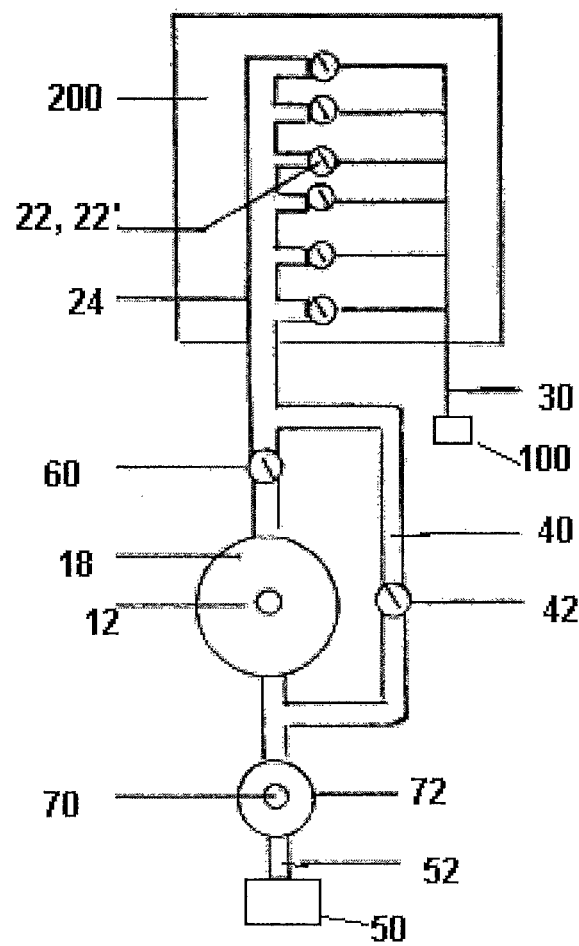
FIG. 2 is a schematic, top perspective view an assembly embodiment.

Referring now to the drawings in general and FIGS. 1 and 2 in particular, it will be understood that the illustrations are for the purpose of describing embodiments of the disclosure and are not intended to limit the disclosure or any inventions thereto. As best seen in FIG. 1, the marine bypass assembly includes primary marine flow channels, a non-marine water supply 18, and secondary bypass channels in fluid communication with downstream discharge conduits to injection assembly 80. These systems and assemblies shown and described herein are adaptable to all marine situations for generally unclogging any inlet, including any upstream or downstream section thereof of any type of vessel, including, but not limited to, boats, ships, yachts, tugs, submarines, and the like.

As illustrated in FIG. 1, the marine bypass system is positioned a marine vessel having at least one marine water intake, for instance scoop strainer 302, located on an exterior surface 300, for instance of a hull of the marine vessel. In this embodiment, the primary marine flow channels are in fluid flow communication with corresponding on-board releases. As shown, system may include a marine water temperature sender 60 and a downstream marine, i.e. raw water, shut off 62. In particular examples, the marine water temperature sender 60 is aligned on the most prominently operated unit's marine intake, for instance near the hull, to sample water on demand. Typically the marine water temperature sender 60 does not sample during any of the heated water cycles shown and described herein. The marine/raw water strainer 14 is shown in communication with at least one injector 80. As shown and described herein the injector may be a heated, non-marine injector, in communication with the marine/raw water solenoid valve 84 and flow meter sensor 82 to detect a loss of flow, etc. As further illustrated, the assembly may include an electronics traducer 86. Additionally, the assembly include a manual shut off valve 94 and heated water temperature sensor 92 to detect a loss of flow, etc.

As shown in FIG. 2, the engine control room 200 may provide organization to any of the downstream heated water solenoids 22, 22' and examples and embodiments shown and described herein. The system includes a freshwater supply assembly 50 in fluid communication with a non-marine water pump and non-marine pressure sender 70 via any series and geometry of conduits 52 as recognized by those skilled in the art having the benefit of this disclosure. In particular examples, the non-marine pressure may be maintained a predetermined pressures, including, but not limited to above about forty pounds per square inch, and volumes for proper delivery of both heated and non-heated supplies. Further, the non-marine water pump may maintain about forty to about sixty pounds per square inch at about four hundred and thirty five gallons per hour, or the like. In particular examples the non-marine water pump is a positive displacement pump in electrical communication with the user interface, for instance to present pressure and volume delivery messages and the like, and to allow a reset pressure toggle. In still other examples, the pumps may be centrifugal, include propellers, and the like and may incorporate a marine/raw water shut off valve to stop the flow of water during non-operation.

As illustrated, a hot water manifold 24 is in fluid communication from a non-marine water supply, for instance the hot water tank 18. The embodiment shown includes a hot water temperature sender 12 and a hot-water by-pass solenoid 60.

In these embodiments, a non-heated, non-marine water supply injection assembly introduces non-heated, non-marine water to deliver any of the functions shown and described herein. For instance, the heated, non-marine water supply injection assembly may include the cold water, i.e. non-heated, by pass 40 and associated solenoid 42.

In particular examples, a user interface, for instance an on-board graphical display, bypasses the primary marine flow channels to the secondary bypass channels under any preselected condition or working environment. For instance, the interface may search for hot water solenoids that have been installed on the marine vessel to indicate active marine/raw water intakes and transducer elements.

In other embodiments, the disclosure includes a bypass interconnect kit. In such an embodiment, the kit may comprise a non-marine water supply injection assembly, e.g. any of the non-marine water supply injection assembly elements and components previously shown or described. Further, other embodiments of the kit may comprise a non-marine injector, e.g. any of the non-marine injector examples and embodiments previously shown or described.

The following experiments demonstrate the efficacy and utility of the present inventions.

Experiment 1:

Initial set-up: Series of abbreviations for mechanical units in the boat, including: PE (port engine), SE (starboard engine), G1 Generator, AC1 air conditioning unit one, AC2 air conditioning unit two on a touch screen display. Those skilled in the art having the benefit of this disclosure will recognize additional embodiments and elements useful throughout the systems and assemblies shown and described herein. Raw water intake diameters will be displayed (for instance 4", 3", 2.5", 2", 1.5", 1", etc.). The proper diameter was selected, the raw water diameter that corresponds to the abbreviated selected mechanical unit. A second view shows raw water intake lengths (for instance 1-10' in six inch increments, or the like). Selection of the proper length for each raw water intake. The electronic transducer appear with corresponding identifications. Processor identifies transducers and sets a cycle, for instance ten seconds. The processor takes the information and hot water temperatures with non-marine water pressure to calculate the cycle duration and sequences between cycles. In these examples, the transducers on a thru-hull injector were placed six to seven inches before the transducers to minimize turbulence.

Cycle start: Hot water was initiated, for instance for two to four seconds, to fill the hot water conduits from the heated source. After the two to four seconds, the marine/raw water solenoid valve (N/O) was energized closing the water intake. The marine/raw water pump continued to run and the heated non-marine water continued to flow (for instance for about ten to fifteen seconds). Next, the heated non-marine water filled the marine/raw water intake from the marine/raw water solenoid valve (in this example out to the scoop strainer), thereby chasing the marine/raw water out of the line and replaced with heated, non-marine water. After about twenty seconds the heated, non-marine water valve was closed and the marine/raw water intake solenoid opened to complete a cycle. The cycling continued to the next system.

In alternative embodiments, a recycle option uses old water for injection to blast various inlets, for instance to blast marine grass and the like loose. This recycle option may be repeated numerous times to reach a pre-determined pressure for the next cycle, with varying durations. In particular examples, this cycling incorporates cold water and the hot water tank will be bypassed, for instance as shown and described herein, using at least one solenoid valve. During cycling processes, the water bypass solenoids are energized and the marine/raw water shut off solenoid on the at least one intake is energized for a period, for instance during about a twenty second delay. In particular examples, a delay, for instance about a tenth of a second delay, occurs in the valve operation to ensure proper delivery of specified water (for instance if non-heated water is triggered subsequent a heated water delivery, then the non-heated water is engaged before the heated water is closed, and vise-versa) and minimize against pump head drumming during operation.

Short Cycle: In a moored marine vessel, marine growth and trash generated greater clogging of the exterior scoop strainer, particularly when on-board units were operating. The short cycle sequence was set between one and twelve hours. The short cycle initiated the non-heated water injections (as shown and described herein) for eight-second durations during heated cycling processes, again those examples and embodiments shown and described herein.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What I claim is:

1. A marine bypass system in a marine vessel having at least one marine raw water intake located on an exterior surface of a hull of said marine vessel, said bypass system comprising:
   a. a heated non-marine water supply injection assembly adapted for introducing heated non-marine water, said heated non-marine water supply injection assembly comprising:
      i. a hot water tank,
      ii. a plurality of non-marine delivery conduits,
      iii. a non-marine water manifold, and
      iv. at least one non-marine water solenoid;
   b. a non-heated, non-marine water supply injection assembly adapted for introducing non-heated, non-marine water, said non-heated, non-marine water supply injection assembly comprising:
      i. a non-marine, non-heated water by-pass, and
      ii. a non-marine, non-heated water solenoid;
   c. a bypass solenoid in fluid communication with a downstream portion of said marine raw water intake and at least one of said non-marine water supply injection assemblies, and
   d. a non-marine injector in fluid communication with at least one of said non-marine water supply injection assemblies and adapted to discharge about said marine raw water intake to remove, when present, marine growth.

* * * * *